April 17, 1962  V. A. NAVIKAS  3,029,765
METHOD OF MAKING A PLASTIC LINED CROWN
Filed June 6, 1958
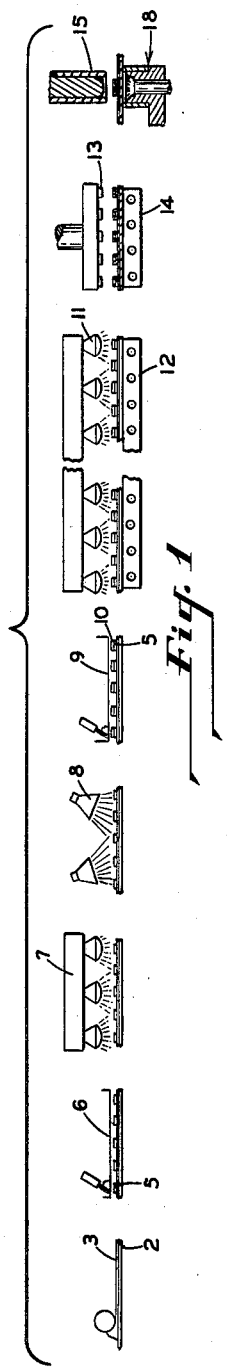
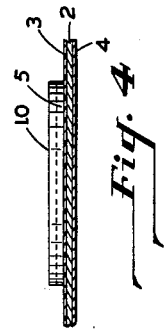
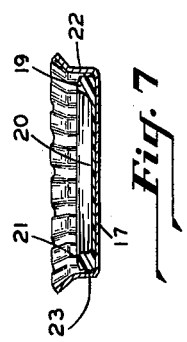
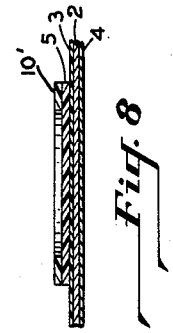
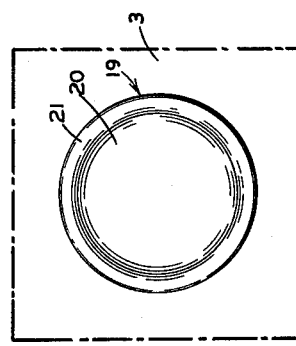
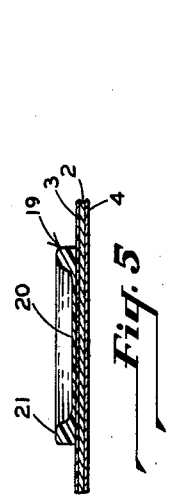
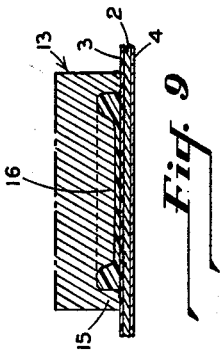
INVENTOR
VICTOR A. NAVIKAS
ATTORNEY United States Patent Office 3,029,765
Patented Apr. 17, 1962

3,029,765
METHOD OF MAKING A PLASTIC LINED CROWN
Victor A. Navikas, Lancaster Township, Lancaster County, Pa., assignor to Armstrong Cork Company, Lancaster, Pa., a corporation of Pennsylvania
Filed June 6, 1958, Ser. No. 740,395
12 Claims. (Cl. 113—80)

This invention relates to a method of making plastic lined crown closures. It is concerned more particularly with a method of making crown closures by blanking and crimping a closure from a flat sheet of metal upon which is formed a sealing liner for the closure comprising a shaped and fused thermoplastic resin plastisol.

Crown closures are customarily made by punching disks from a sheet of tin-plated steel and forming these disks into metal crown shells. Disks of cork composition which are to form the sealing liner for the closure are positioned within the metal crown shells with an adhesive interposed between liner and shell. Heat and pressure are applied to join the liner to the shell.

Crown closures also have been made by depositing a fluid plastisol composition within a formed crown shell and then applying a heated plunger against the plastisol within the shell to distribute the plastisol over the inner head of the crown shell and to fuse the plastisol and bond it to the shell to provide a resilient sealing liner firmly secured to the metal shell.

Both of these processes are expensive and require large capital expeditures for machinery to deposit the liner in the shell and to bond it to the shell.

An object of the present invention is to provide a process of making a plastisol lined crown in which the liner is formed completely on the flat metal sheet prior to shell formation.

Another object of the invention is to provide a process of making a plastisol lined crown in which a layer of a thermoplastic resin plastisol composition of essentially uniform thickness is printed onto a metal sheet, the plastisol is at least partially solvated, and it is then contoured by embossing to a desired nonuniform thickness to provide a sealing liner of the desired configuration for optimum sealing characteristics.

Generally stated, the method of the present invention contemplates screen printing upon a flat sheet of metal crown plate a plurality of spaced liner disks of substantially uniform thickness throughout of a thermoplastic resin plastisol composition. Each of these disks overlies an area corresponding to substantially the entire internal head wall of a crown shell to be formed from the metal crown plate. The plastisol disks are then at least partially solvated by the application of heat thereto. The plastisol disks are preferably not fused but merely gelled in this step. The gelled disks are then embossed to a desired contour by heated embossing punches. Each punch displaces the plastisol in the center of a disk toward the periphery to provide a sealing bead in the liner which will engage the bottle lip when the crown closure is applied to a bottle. The plastisol is fused under the heat and pressure conditions of embossing. After suitable cooling, the metal sheet with the contoured liners formed thereon and firmly joined to the metal plate is fed to a metal shearing and forming punch press, such as the conventional double-action crown shell-forming presses used in the crown closure industry, where the sheet is cut into disks with a liner disposed in the center of each disk and the disks are formed into the desired crimp-skirted crown shell. No further fabricating operations are required; the completed closures are ready for inspection, counting, packaging, and shipping.

In order that the invention may be readily understood, certain embodiments thereof will be described in conjunction with the attached drawing, in which:

FIGURE 1 is a diagrammatic view illustrating the steps involved in practice of a typical embodiment of the method;

FIGURE 2 is an enlarged sectional view showing a portion of a sheet of metal crown plate bearing a lithographed decoration on one surface and a priming and bonding coating on the other surface;

FIGURE 3 is a view similar to FIGURE 2, showing the metal crown plate of FIGURE 2 having a disk of liner composition applied thereto;

FIGURE 4 is a view similar to FIGURE 3, showing the application of a second disk of liner composition over the liner disk of FIGURE 3;

FIGURE 5 is a view similar to FIGURE 4, showing the composite liner disk of FIGURE 4 embossed to a desired contour;

FIGURE 6 is a top plan view of a portion of the metal crown plate showing an embossed liner disk as illustrated in section in FIGURE 5;

FIGURE 7 is a cross sectional view of a crown closure formed from the lined metal crown plate of FIGURE 6;

FIGURE 8 is an enlarged sectional view showing a modified liner formation, prior to embossing; and FIGURE 9 is a sectional view to an enlarged scale showing one of the embossing punches upon completion of the embossing operation.

Referring to FIGURE 1, which illustrates the steps to be followed in the practice of a typical embodiment of the invention, a flat sheet of metal crown plate 2, such as a sheet of 100-pound tin-plated steel about 27" x 34½", has a priming and bonding coating of vinyl lacquer 3 applied thereto. This may be applied by a roll coater, a spray, or other means. A suitable vinyl chloride-phenolic lacquer such as Stoner Mudge Company's S-1325F lacquer may be used. These so-called sanitary lacquers are well-known in the art and need no further description, for the method of the present invention is not concerned with the use of any particular priming and bonding lacquer or other coating. It is preferred, of course, to use a vinyl chloride resin lacquer where a vinyl chloride resin plastisol is to be used in the formation of the crown liner.

As illustrated in FIGURE 2, the metal crown plate 2 may be, and generally is, provided on the flat face thereof opposite to the surface to which the priming and bonding coating 3 is applied with a decoration or a protective coating 4. This may be the conventional lithographic decoration applied to the flat sheet of metal crown plate.

After the priming and bonding lacquer has hardened, as by passing it through a drying oven at about 350° F. to 375° F. to evaporate the solvent and cure the lacquer composition, a plurality of spaced liner disks 5 are screen printed onto the priming coating 3 on the metal crown plate 2. These disks are of generally uniform thickness throughout, although it is recognized that in any screen printing process where a squeegee is used to deliver the material to be printed and to press it through the screen, variations in thickness are inevitable where a relatively thick layer of material is printed through the screen. Each liner disk overlies an area corresponding to substantially the entire internal head wall area of the crown shell which ultimately is formed from the metal crown plate. For instance, with a sheet of metal crown plate 27" x 34½", as mentioned above, the liner disks may be about 1.000" in diameter and positioned in 20 rows, with 22 liner disks in each row to provide 440 disks on each plate. The head wall of each crown shell may be about 1.050" in diameter. While it is preferred to have the liner disk as screen printed on the metal crown plate correspond with the diameter of the head wall of the crown shell to be formed, the liner disk may be slightly smaller. As noted above, a liner disk 1.000" in diameter will be suitable for a crown shell having a head wall diameter of 1.050," there being a slight lateral extrusion of the liner material during a subsequent embossing operation which will be more fully hereinafter described.

The liner disks are formed of thermoplastic resin plastisol, that is, finely divided particles of thermoplastic resin dispersed in a plasticizer which is essentially a nonsolvent for the resin particles at room temperatures but which is a solvent for the particles at elevated fluxing temperatures. The vinyl resin plastisols are preferred. Vinyl resin plastisols are well-known in the art and are commercially available products. The following example is typical of many suitable plastisol compositions:

Example I

| | Parts by weight |
|---|---|
| Marvinol VR50 (polyvinyl chloride in fine powder form) | 100 |
| Dioctylphthalate (plasticizer) | 80 |
| Stayrite 90 (calcium stearate) lubricant and stabilizer | 3 |
| $TiO_2$ pigment | 5 |
| Lamp black pigment | 0.5 |

The composition preferably is applied through a metal screen onto the priming and bonding coating 3 as diagrammatically illustrated in FIGURE 1 where the numeral 6 has been applied to the screen printing apparatus diagrammatically shown.

Typically, the liner may be about .024" to .026" thick before embossing and contouring. The important consideration, of course, is to have an adequate volume of plastisol composition to provide a liner disk as finally contoured which will provide a satisfactory seal at the outer periphery of the liner and will provide an adequate thickness of plastisol composition in the head portion of the liner, within the confines of the sealing head, to protect the metal shell from contact with the container contents. To obtain this desired volume of material in some instances, with certain types of screen printing and certain types of plastisols, it may be required that the liner disks be made by superimposing two thicknesses of plastisol composition, one on top of the other. This method has been illustrated in FIGURE 1.

In this method, the first applied liner disks may be passed under a bank of infrared heaters 7, as shown in FIGURE 1, which will elevate the temperature of the disks, at the upper surface at least, to about 175° to 200° F., to set or form a partially solvated gel of the plastisol to permit, after the plastisol disks have cooled, the application of additional quantities of plastisol thereover as superimposed disks, annular rings, or other deposits. The setting temperature and time will vary with the plastisol used. It is preferred not to fuse or completely set the plastisol prior to the embossing operation as will be discussed more fully hereinafter.

The sheet with the set or gelled plastisol thereon is then moved into a cooling zone where cooling air from nozzles 8 is directed onto the surface of the plastisol disks. This will reduce the surface temperature of the disks, preferably to a temperature in the order of 70° to 90° F.

The sheet with the cooled disks thereon then moves into position under a screen printing unit 9, similar to the unit 6 previously described. Here disks 10, preferably of the same plastisol composition as the disks 5, are printed in superimposed position over the disks 5 for amalgamation therewith.

The sheet with the disks thereon now moves into and through a heating zone where the plastisol of the disks 10 is set or gelled and the composite disks 5—10 may be preheated for embossing. Generally, a single screen printing unit as shown in FIGURE 1, printing a whole sheet of 440 liners on each plate at each cycle of operation, will supply a plurality of crown shell forming presses which punch the metal plate into disks with a liner in the center of each disk and then form the disks into crowns. With this system, a liner embossing press will be provided for each forming press, and the two will be synchronized. As mentioned previously, it is preferred to fuse the plastisol composition in the embossing press. Where the printing line feeds a plurality of embossing presses, it may be desirable to accumulate the sheets in advance of the embossing operation. In such event, the sheets with the disks 5 and 10 thereon may be heated to at least partially solvate the plastisol of disks 10 to gel it and permit handling. This may be accomplished by infrared heaters 11 which, like the heaters 7 previously described, heat the disks to about 175° F. to 200° F. If the disks are to be embossed immediately, platen 12 may be heated and the temperature of the composite disks 5 and 10 may be elevated to a temperature which is preferably slightly below the fusion temperature of the plastisol composition, from about 250° F. to 275° F., for example. This will reduce the dwell time required for embossing and fusing the liner disks in the next step. The plastisol composition is thermoplastic, and fusion may be effected before embossing. This will require, however, that the composition be heated to its softening temperature either in the embossing operation or in a preheating step, or partially in both.

The embossing punches are indicated at 13 in FIGURES 1 and 9. The embossing punches are heated to a temperature in the order of 400° to 450° F. The platen 14 upon which the sheet rests during embossing also is heated, preferably in the order of 300° to 350° F. With the plastisol composition of Example I, development of a temperature of about 350° F. in the disks 5—10 is satisfactory to effect proper fusion of the plastisol composition. The temperature of the embossing punches and the supporting platens will vary, of course, with the dwell time of the embossing operation, the plastisol used, the volume of material to be heated, and other variable factors. These limitations are well recognized by those in the art. The temperatures given above are for a plastisol composition as given in Example I, in a volume of about 300–350 milligrams per liner disk, with 440 liners per sheet to be embossed at one time with a dwell time of 7 seconds. Embossing under heat and pressure performs a triple function: It shapes the plastisol disks to the desired contour on the metal crown sheet; it fuses the plastisol composition; and it permanently bonds the plastisol disks to the metal crown plate through the intermediary of the vinyl resin priming and bonding lacquer coating 3. Since the vinyl resin plastisol is a thermoplastic composition, it is possible to fuse the plastisol composition prior to embossing; but as mentioned above, with the composition of Example I, it is preferred only to set or gel it prior to embossing and to effect final fusing in the embossing station. The gelled but not completely fused plastisol disks are more readily contoured in the embossing operation than are completely fused disks.

It may be necessary or desirable with some plastisol compositions and some embossing tools to provide a film of lubricant between the embossing tool and the plastisol composition to prevent the plastisol from sticking to the embossing tool. This may be accomplished by coating the upper surface of the gelled disks with a silicone oil such as Dow-Corning Silicone D–200, a dimethyl silicone oil described on page 37 of the book, Silicones and Their Uses, published by McGraw-Hill Book Company, copyright 1954. The lubricating coating may be applied by a felt covered roll. The heated tools may be flash lubricated by spraying.

It will be noted by reference to FIGURE 9 that each embossing punch includes an annular confining wall 15 which engages the metal crown plate or the coating 3 in an area surrounding the plastisol composition deposited on the metal crown plate so that when the central portion 16 of the die is brought into engagement with the deposited mass of plastisol composition, the mass is displaced, contouring the liner to the desired configuration within the confines of the head wall 17 of the crown shell (FIGURE 7) as finally formed. This is important, for the liner composition should not extend in substantial volume over the portion of the metal which will form the skirt of the crown for it will interfere with proper shell formation and will undesirably alter contour of the liner or may result in its rupture in the forming operation. Preferably, the liner is so contoured that the liner sealing bead is spaced slightly from the skirt of the closure shell after final crown formation.

The sheet with the fused disks contoured to the desired shape is now in condition, upon proper cooling to harden the thermoplastic vinyl resin disks, for formation of crown closures. This may be accomplished in a conventional crown forming press as shown diagrammatically at 18 in FIGURE 1. A double-acting press is generally used, and this first shears circular disks from the metal crown plate; and while these disks are held in position, forming plungers press the disks into contour forming dies which crimp the skirts of the shells to the desired contour. Generally a whole row of crowns is formed upon each stroke of the press.

Referring now to FIGURE 2, the coating 3 preferably is a vinyl resin lacquer as described above. Other bonding lacquers or coatings may be used, of course. The decoration 4 may be any conventional lithographic ink decoration, may be a plain or colored protective coating, or may be plain exposed tin plating.

Other thermoplastic resin plastisols may be used in place of the vinyl chloride resin plastisol of Example I. Goodrich Rubber Company's Pliovic AO which is a polyvinyl chloride resin plastisol may be used. It contains about 95% vinyl chloride and 5% vinyl acetate or other internal plasticizer in the copolymer. The method obviously will be applicable to any thermoplastic resin plastisol; although, as mentioned above, the vinyl resin plastisols are most commonly known and are ideally suited for food and beverage closure use because they are tasteless and odorless when fused and possess good sealing properties.

In FIGURE 3, the plastisol disk 5 may be about 1.000" in diameter where the head wall 17 of the crown is about 1.050" in diameter as previously mentioned. The disk may be about .0125" thick. The two super-imposed disks shown in FIGURE 4 may be of the same diameter, about 1.000", and each about .0125" thick, making a composite disk about .025" thick and providing about 300-350 milligrams of composition. The diameter and thickness of the liner disk will vary with crowns of various sizes. Also, the size and thickness of the upper disk may be varied; for, as mentioned above, the essential requirement is to provide an adequate volume of material for contouring to the desired configuration. Thus, the upper deposit may be smaller in diameter than the lower deposit, and thus the problem of registration of the two deposits may be minimized. The major portion of the volume may be applied in first screen printing operation, and the second deposit may be of lesser volume, being of lesser thickness or diameter or both; or, if desired, the first deposit may be of lesser volume than the second deposit. As mentioned previously, the disk may be formed of a single deposit provided the required quantity of plastisol composition can be so applied. Also, as shown in FIGURE 8, the required quantity may be applied in the form of a disk-shaped deposit 5 and a superimposed annular deposit 10'. The deposit 10' may be made through screen printing unit 6 suitably masked so as to deliver an annular body of material therethrough.

FIGURES 5 and 6 show the liner disk after contouring in the embossing operation. The disk 19 in the embodiment described now is about 1.050" in diameter, corresponding to the diameter of the head wall 17 of the crown shell. The central area 20 of the disk has been reduced in thickness to about .006", and the annular sealing bead 21 has been increased in thickness to about .035". The central portion 20 is about ⅞" in diameter. No attempt has been made in the drawing to show the various parts to scale. For instance, the coating 3 will generally be of lesser thickness than the thickness of the liner in the area 20. For sake of clarity of illustration, some parts have been shown to enlarged scale.

A completed crown is shown in FIGURE 7. It will be noted that the liner 19 covers the entire head wall 17 of the shell and that the skirt portion 22 conforms closely to the outer periphery of the liner but that it is not deformed by the formation of the skirt portion 22. Actually, as shown in the drawing, it is preferred to have a slight clearance, as indicated at 23, between the outer wall of the liner and the thinner wall of the skirt to avoid distortion of and possible damage to the liner. The liner sealing bead 21 is positioned where it will engage the lip of the bottle to be sealed. In this view, the priming and bonding coating 3 and decoration 4 have not been shown.

I claim:

1. A method of making crown closures including a metal shell and a resilient plasticized thermoplastic resin sealing liner, the steps comprising screen printing upon a flat sheet of metal crown plate a plurality of spaced liner disks of a thermoplastic resin plastisol, with said disks each overlying an area of the internal head wall of a crown shell to be formed from said metal crown plate, heating said liner disks deposited on said flat sheet to at least partially solvate and gel said plastisol, embossing said liner disks of at least partially solvated and gelled plastisol on said metal crown plate by the application of heated embossing punches to said liner disks to displace and contour said liner composition and form contoured liners on said sheet of plasticized thermoplastic resin resulting from fusion of said plastisol, cooling said contoured liners to harden the plasticized thermoplastic resin of which they are formed, and shearing and forming crowns from said metal crown plate with liners disposed in position therein at the inner head wall of each crown shell.

2. A method of making crown closures including a metal shell and a resilient plasticized thermoplastic resin sealing liner, the steps comprising screen printing upon a flat sheet of metal crown plate a plurality of spaced liner disks of substantially uniform thickness throughout of a thermoplastic resin plastisol, with said disks each overlying an area corresponding to substantially the entire internal head wall of a crown shell to be formed from said metal crown plate, heating said flat sheet of metal crown plate and liner disks deposited thereon to at least partially solvate and gel said plastisol, embossing said disks of gelled plastisol on said metal crown plate by the application of heated embossing punches to said liner disks to contour and displace said liner composition from the central area of each of said disks where the thickness of the disk is thereby decreased toward the periphery thereof where the thickness of the disk is thereby increased in an area corresponding to the sealing area of the liner disk, cooling said contoured liners to harden the plasticized thermoplastic resin of which they are formed, and shearing and forming crowns from said metal crown plate with liners disposed in position therein at the inner head wall of each crown shell.

3. In a method of making crown closures including a metal shell and a resilient thermoplastic sealing liner, the steps comprising printing upon a flat sheet of metal crown plate a plurality of spaced liner disks of a thermoplastic resin plastisol, with said disks each overlying an area less than the entire internal head wall of a crown shell to be formed from said metal crown plate, embossing said disks under heat and annular confinement to contour said disks substantially wholly within the confines of said head wall areas and increasing the thickness of said disks in the sealing area of the liner disk, cooling said contoured liners to harden the plasticized thermoplastic resin of which they are formed, and shearing and forming crowns from said metal plate with liners disposed in position therein substantially wholly within the confines of the head walls thereof.

4. A method of making crown closures including a metal shell and a resilient plasticized thermoplastic resin sealing liner, the steps comprising screen printing upon a flat sheet of metal crown plate a plurality of spaced liner disks of a thermoplastic vinyl resin plastisol, with said disks each overlying an area confined to the internal head wall of a crown shell to be formed from said metal crown plate, heating said liner disks deposited on said flat sheet to partially solvate and gel said vinyl resin plastisol, embossing said liner disks of partially solvated and gelled plastisol on said metal crown plate by the application of heated embossing punches to said liner disks to displace and contour said plastisol and fuse the same and form contoured liners on said sheet of plasticized thermoplastic vinyl resin resulting from fusion of said vinyl resin plastisol, cooling said contoured liners to harden the plasticized thermoplastic vinyl resin of which they are formed, and shearing and forming crowns from said metal crown plate with liners disposed in position therein at the inner head wall of each crown shell.

5. A method of making crown closures including a metal shell and a resilient plasticized thermoplastic resin sealing liner, the steps comprising screen printing upon a flat sheet of metal crown plate a plurality of spaced liner disks of a thermoplastic resin plastisol, with said disks each overlying an area confined to the internal head wall of a crown shell to be formed from said metal crown plate, heating said liner disks deposited on said flat sheet to partially solvate and gel said plastisol, embossing said liner disks of partially solvated and gelled plastisol on said metal crown plate under heat to form contoured sealing liners thereon of plasticized thermoplastic resin from said plastisol which is fused in the embossing step, during the embossing confining the flow of each said deposit of liner material to an area substantially wholly within the confines of the inner head wall of a crown shell to be formed from said metal crown plate, cooling said contoured liners to harden the plasticized thermoplastic resin of which they are formed, and shearing and forming crowns from said metal crown plate with liners disposed in position therein at the inner head wall of each crown shell with the outer peripheral wall of each said liner spaced slightly from the inner wall of the skirt of the crown shell in which it is positioned.

6. A method of making crown closures including a metal shell and a resilient plasticized thermoplastic resin sealing liner, the steps comprising screen printing upon a flat sheet of metal crown plate a plurality of spaced liner disks of a polyvinyl chloride resin plastisol, with said disks each overlying an area of the internal head wall of a crown shell to be formed from said metal crown plate, heating said liner disks to a temperature in the order of about 175° to about 200° F. on said flat sheet to partially solvate and gel said plastisol, embossing said liner disks of partially solvated and gelled plastisol on said metal crown plate under heat to displace and contour said plastisol and elevate the temperature thereof to at least about 350° F. to fuse said plastisol and form contoured liners on said sheet of plasticized polyvinyl chloride resin from said fused plastisol, cooling said contoured liners to harden the plasticized polyvinyl chloride resin of which they are formed, and shearing and forming crowns from said metal crown plate with liners disposed in position therein at the inner head wall of each crown shell.

7. A method of making crown closures including a metal shell and a resilient plasticized thermoplastic resin sealing liner, the steps comprising coating a flat sheet of metal crown plate with a polyvinyl chloride resin bonding coating, screen printing upon said bonding coating a plurality of spaced liner disks of polyvinyl chloride resin plastisol, heating said liner disks deposited on said flat sheet to partially solvate and gel said plastisol, embossing said liner disks of partially solvated and gelled plastisol on said metal crown plate under heat to displace and contour said plastisol, to fuse the same, and to bond the liners to said metal crown plate through said bonding coating, cooling said contoured liners to harden the plasticized polyvinyl chloride resin of which they are formed, and shearing and forming crowns from said metal crown plate with liners disposed in position therein at the inner head wall of each crown shell.

8. A method of making crown closures including a metal shell and a resilient plasticized thermoplastic resin sealing liner, the steps comprising screen printing as a first deposit upon a flat sheet of metal crown plate a plurality of spaced liner disks of a thermoplastic resin plastisol, with said disks each overlying an area of the internal head wall of a crown shell to be formed from said metal crown plate, heating said liner disks so deposited on said flat sheet to at least partially solvate and gel said plastisol, cooling said liner disks so deposited on said flat sheet to harden the same, screen printing as a second deposit in superimposed position upon said first deposited liner disks additional thermoplastic resin plastisol composition, heating said second deposit to at least partially solvate and gel the same, embossing said liner disks under heat to displace and contour said liner composition and form contoured liners on said sheet of plasticized thermoplastic resin from said fused plastisol, cooling said contoured liners to harden the plasticized thermoplastic resins of which they are formed, and shearing and forming crowns from said metal crown plate with liners disposed in position therein at the inner head wall of each crown shell.

9. A method of making crown closures including a metal shell and a resilient plasticized thermoplastic resin sealing liner, the steps of claim 8 in which the first and second deposits of plastisol composition are of different dimensions.

10. A method of making crown closures including a metal shell and a resilient plasticized thermoplastic resin sealing liner, the steps of claim 9 in which the first deposit is in disk form and the second deposit is in the form of an annular ring superimposed upon the disk.

11. A method of making crown closures including a metal shell and a resilient plasticized thermoplastic resin sealing liner, the steps of claim 9 in which the first and second deposits are of disk form and the second deposit is of lesser diameter than the first.

12. A method of making crown closures including a metal shell and a resilient plasticized thermoplastic resin sealing liner, the steps of claim 4 in which a film of lubricant is interposed between the plastisol composition and the embossing surface.

References Cited in the file of this patent

UNITED STATES PATENTS

| | | |
|---|---|---|
| 2,238,681 | Dorough | Apr. 15, 1941 |
| 2,516,647 | Rogers et al. | July 25, 1950 |
| 2,663,908 | Maier et al. | Dec. 29, 1953 |
| 2,663,909 | Maier et al. | Dec. 29, 1953 |
| 2,861,007 | Hazeltine | Nov. 18, 1958 |

UNITED STATES PATENT OFFICE
CERTIFICATE OF CORRECTION

Patent No. 3,029,765                    April 17, 1962

Victor A. Navikas

It is hereby certified that error appears in the above numbered patent requiring correction and that the said Letters Patent should read as corrected below.

Column 6, line 18, for "thinner" read -- inner --; column 8, line 60, for the claim reference numeral "4" read -- 1 --.

Signed and sealed this 7th day of August 1962.

(SEAL)
Attest:

ERNEST W. SWIDER
Attesting Officer

DAVID L. LADD
Commissioner of Patents